(12) United States Patent
Shiraishi et al.

(10) Patent No.: US 8,582,056 B2
(45) Date of Patent: Nov. 12, 2013

(54) LIQUID CRYSTAL DISPLAY DEVICE AND LIGHTGUIDE HAVING LOCAL-AREA AND WIDE-AREA LINE-SHAPED PROTRUSIONS ON THE LIGHTGUIDE EMISSION FACE

(75) Inventors: Yasuhisa Shiraishi, Mobara (JP); Takashi Kuwabara, Isumi (JP)

(73) Assignee: Hitachi Displays, Ltd., Chiba (JP)

( * ) Notice: Subject to any disclaimer, the term of this patent is extended or adjusted under 35 U.S.C. 154(b) by 43 days.

(21) Appl. No.: 13/297,293

(22) Filed: Nov. 16, 2011

(65) Prior Publication Data

US 2012/0127399 A1 May 24, 2012

(30) Foreign Application Priority Data

Nov. 22, 2010 (JP) ................................ 2010-260019

(51) Int. Cl.
*G02F 1/1335* (2006.01)
(52) U.S. Cl.
USPC ............. 349/65; 362/612; 362/619; 362/620
(58) Field of Classification Search
USPC ..................... 362/315, 617, 619, 620; 349/65
See application file for complete search history.

(56) References Cited

U.S. PATENT DOCUMENTS

| 2003/0174492 A1* | 9/2003 | Ohkawa ........................... 362/31 |
| 2006/0114372 A1 | 6/2006 | Saito et al. |
| 2009/0323372 A1* | 12/2009 | Kurihara et al. .............. 362/620 |
| 2010/0277947 A1 | 11/2010 | Nagata |
| 2013/0057807 A1* | 3/2013 | Goto et al. ....................... 349/65 |

FOREIGN PATENT DOCUMENTS

| JP | 2002-184225 | 6/2002 |
| JP | 2006-154292 | 6/2006 |
| JP | 2010-205713 | 9/2010 |
| WO | WO 2009/084513 | 7/2009 |

\* cited by examiner

*Primary Examiner* — Mark Robinson
*Assistant Examiner* — Zachary A Nemtzow
(74) *Attorney, Agent, or Firm* — Antonelli, Terry, Stout & Kraus, LLP.

(57) ABSTRACT

A lightguide to be used in a liquid crystal display device includes a light exit surface, a reflection surface opposed to the light exit surface, and a light entrance surface, which is one side surface. In a region of the light exit surface or the reflection surface, which is on a front side of an intermediate portion between two light sources when viewed from the light entrance surface, a plurality of local-area line-shaped protrusions are arranged, which are extending in a first direction. Each of the local-area line-shaped protrusions reflects the entered light so that a component of the entered light which is orthogonal to the first direction is weakened. A length of a local-area line-shaped protrusion farthest from the two adjacent light sources, is larger than a length of a local-area line-shaped protrusion closest to any one of the two adjacent light sources.

9 Claims, 7 Drawing Sheets

PRIOR ART

LIQUID CRYSTAL DISPLAY DEVICE AND LIGHTGUIDE HAVING LOCAL-AREA AND WIDE-AREA LINE-SHAPED PROTRUSIONS ON THE LIGHTGUIDE EMISSION FACE

CROSS-REFERENCE TO RELATED APPLICATION

The present application claims priority from Japanese application JP 2010-260019 filed on Nov. 22, 2010, the content of which is hereby incorporated by reference into this application.

BACKGROUND OF THE INVENTION

1. Field of the Invention

The present invention relates to a liquid crystal display device and a lightguide.

2. Description of the Related Art

A liquid crystal display device is widely used as a display device for a television set or an information communication terminal such as a computer. The liquid crystal display device controls the image to be displayed by changing the orientation of liquid crystal molecules to change the light transmittance. Liquid crystal itself does not emit light, and hence a reflective liquid crystal display device uses sunlight or light in the room by reflecting the light, or the liquid crystal display device uses an illuminating device called a backlight unit. As a structure of the backlight unit, a direct type backlight unit, which includes a light source on a rear side of a display surface of a liquid crystal panel, and a side-light type backlight unit, in which light emitted from the side is reflected to illuminate a display surface of a liquid crystal panel, are mainly known. In recent years, a light emitting diode (LED) has been increasingly used as the light source of the backlight unit. Japanese Patent Application Laid-open No. 2002-184225 discloses a backlight unit using the LED.

In the side-light type backlight unit using the LED, a member called a lightguide (light guide plate) is used. The lightguide reflects light entering from the side of the display surface of the liquid crystal panel toward the display surface. FIG. 13 is a view illustrating an example of a conventional lightguide 200. The lightguide 200 includes a light exit surface 220 which causes the light to exit toward the liquid crystal panel. The lightguide has a rectangular shape when viewed from the direction of the light exit surface 220. The lightguide includes a plurality of LED light sources 60, which are provided in contact with a light entrance surface 210, which is a side surface corresponding to one side of the opposing short sides of the rectangular shape. The plurality of LED light sources 60 are arranged in a direction in which the one side of the lightguide extends. A reflection surface of the lightguide is opposed to the light exit surface 220, and the reflection surface reflects part of light emitted from the LED light sources 60 and traveling inside the lightguide 200 toward a direction close to the outward normal of the light exit surface 220. The reflection surface has a structure capable of reducing unevenness of the light exiting from the light exit surface 220, in particular, unevenness of the light in the long side direction of the rectangular shape when viewed from the direction of the light exit surface 220.

On the light exit surface 220, a plurality of line-shaped protrusions 221 are formed, which extend from a position spaced apart by a fixed clearance from one side on the light entrance surface 210 side, toward the opposite side, which is on a side of a surface opposed to the light entrance surface 210. The line-shaped protrusion 221 has a cross section in, for example, an arc shape or a V-shape. When the light is reflected at the position of the line-shaped protrusion 221, the line-shaped protrusion 221 weakens the light component in a direction orthogonal to the extending direction of the line-shaped protrusion 221, to thereby make the light beams exiting from the light exit surface 220 the same direction.

When the side-light type backlight unit using a point light source such as the LED is used, there arises the following problem. That is, there occurs a phenomenon that, in a region of a display region of the liquid crystal display device, which corresponds to the vicinity of the light entrance surface, a part close to any of the point light sources is bright, and a part far from all of the point light sources is dark (so-called luminance unevenness). Therefore, for example, it has been necessary to separate the light entrance surface and the display region by an approximately fixed clearance.

SUMMARY OF THE INVENTION

The present invention has been made in view of the above-mentioned problem, and therefore has an object to provide a lightguide, which is capable of reducing luminance unevenness of a light exit surface in the vicinity of a light entrance surface, and provide a liquid crystal display device using the lightguide.

A summary of representative aspects of the present invention disclosed in this application is simply described below.

(1) A liquid crystal display device, including: a lightguide including: a light exit surface from which light exits; a reflection surface opposed to the light exit surface; and a light entrance surface, which is one side surface with respect to the light exit surface and through which the light enters; a liquid crystal panel arranged opposed to the light exit surface of the lightguide; and a plurality of light sources for causing the light to enter through the light entrance surface, in which: the lightguide further includes a plurality of local-area line-shaped protrusions, which are each a line-shaped protrusion extending in a first direction intersecting the light entrance surface, the plurality of local-area line-shaped protrusions being arranged on one of a region of the reflection surface and a region of the light exit surface on a front side of an intermediate portion between two adjacent light sources of the plurality of light sources when viewed from the light entrance surface; each of the plurality of local-area line-shaped protrusions reflects light inside the lightguide so that a component of the light which is orthogonal to the first direction is weakened; one of ends, which is farther from the light entrance surface, of the each of the plurality of local-area line-shaped protrusions is provided at a position closer to the light entrance surface relative to an end, which is farthest from the light entrance surface, of a light exit region on the light exit surface, the light exit region corresponding to a display region; and a distance between the light entrance surface and one of ends, which is farther from the light entrance surface, of a local-area line-shaped protrusion of the plurality of local-area line-shaped protrusions, which is farthest from the two adjacent light sources, is larger than a distance between the light entrance surface and one of ends, which is farther from the light entrance surface, of a local-area line-shaped protrusion of the plurality of local-area line-shaped protrusions, which is closest to any one of the two adjacent light sources.

(2) The liquid crystal display device according to the above-mentioned item (1), in which: the lightguide further includes a plurality of wide-area line-shaped protrusions, which are each a line-shaped protrusion extending in the first direction, the plurality of wide-area line-shaped protrusions being arranged in a region on the light exit surface, which is separated from the light entrance surface by a fixed clearance or larger and in which the plurality of local-area line-shaped protrusions are absent; and each of the plurality of wide-area line-shaped protrusions reflects the light inside the lightguide so that the component of the light which is orthogonal to the first direction is less weakened compared to the each of the plurality of local-area line-shaped protrusions.

(3) The liquid crystal display device according to the above-mentioned item (2), in which: each of the plurality of wide-area line-shaped protrusions and each of the plurality of local-area line-shaped protrusions have an arc-like cross section; and a central angle of each of the plurality of local-area line-shaped protrusions is larger than a central angle of each of the plurality of wide-area line-shaped protrusions.

(4) The liquid crystal display device according to the above-mentioned item (2), in which: each of the plurality of wide-area line-shaped protrusions and each of the plurality of local-area line-shaped protrusions have a V-shaped cross section; and an angle between the light exit surface and each of the plurality of local-area line-shaped protrusions is larger than an angle between the light exit surface and each of the plurality of wide-area line-shaped protrusions.

(5) The liquid crystal display device according to any one of the above-mentioned items (1) to (4), in which a length of the local-area line-shaped protrusion of the plurality of local-area line-shaped protrusions, which is farthest from the two adjacent light sources, is larger than a length of the local-area line-shaped protrusion of the plurality of local-area line-shaped protrusions, which is closest to any one of the two adjacent light sources.

(6) The liquid crystal display device according to any one of the above-mentioned items (1) to (5), in which the plurality of local-area line-shaped protrusions are arranged between the light exit region on the light exit surface and the light entrance surface.

(7) A lightguide, which is to be used in a liquid crystal display device, including: a light exit surface including a light exit region, which causes light to be used for display to exit; a reflection surface opposed to the light exit surface; a light entrance surface, which is one side surface with respect to the light exit surface and through which the light from a plurality of light sources enters; and a plurality of local-area line-shaped protrusions, which are each a line-shaped protrusion extending in a first direction intersecting the light entrance surface, the plurality of local-area line-shaped protrusions being arranged on one of a region of the reflection surface and a region of the light exit surface on a front side of an intermediate portion between two adjacent light sources of the plurality of light sources when viewed from the light entrance surface, in which: each of the plurality of local-area line-shaped protrusions reflects the entered light so that a component of the entered light which is orthogonal to the first direction is weakened; one of ends, which is farther from the light entrance surface, of the each of the plurality of local-area line-shaped protrusions is provided at a position closer to the light entrance surface relative to an end, which is farthest from the light entrance surface, of the light exit region; and a distance between the light entrance surface and one of ends, which is farther from the light entrance surface, of a local-area line-shaped protrusion of the plurality of local-area line-shaped protrusions, which is farthest from the two adjacent light sources, is larger than a distance between the light entrance surface and one of ends, which is farther from the light entrance surface, of a local-area line-shaped protrusion of the plurality of local-area line-shaped protrusions, which is closest to any one of the two adjacent light sources.

According to the present invention, it is possible to reduce the luminance unevenness of the light exit surface of the lightguide in the vicinity of the light entrance surface. With this, for example, a so-called peripheral region of the liquid crystal display device can be formed narrower.

DETAILED DESCRIPTION OF THE INVENTION

Hereinafter, an embodiment of the present invention is described with reference to the drawings. Of the components described herein, components having the same function are denoted by the same reference symbol, and description thereof is omitted.

Figure 1:
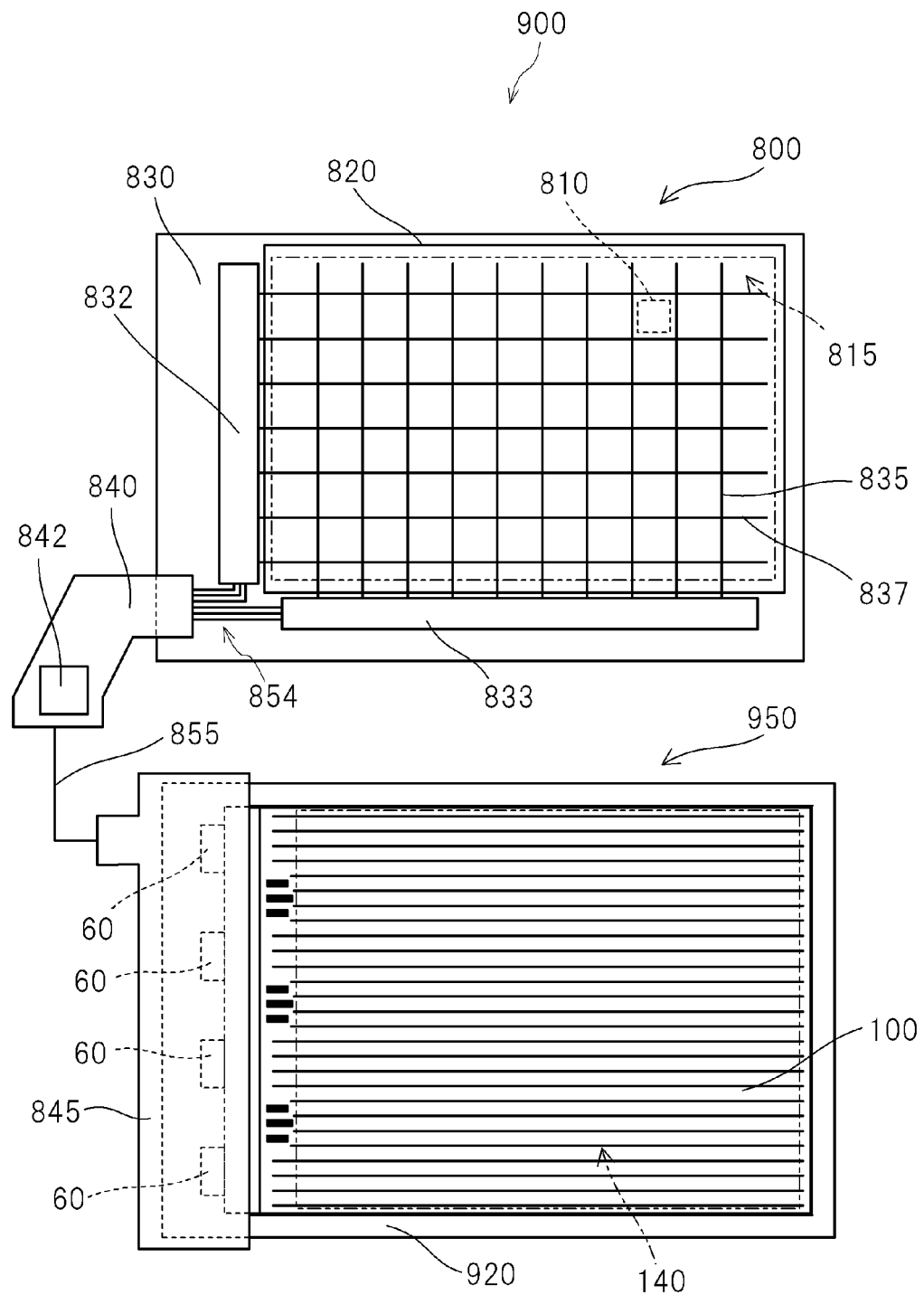
FIG. 1 is a view schematically illustrating an example of a liquid crystal display device according to an embodiment of the present invention.

FIG. 1 is a view schematically illustrating an example of a liquid crystal display device 900 according to the embodiment of the present invention. As illustrated in FIG. 1, the liquid crystal display device 900 includes a liquid crystal panel 800, a backlight unit 950, and a control circuit 842.

The liquid crystal panel 800 is formed of two substrates, that is, an array substrate 830 and a color filter substrate 820, and liquid crystal is sealed between those substrates. On the array substrate 830, there are arranged drive circuits 832 and 833, a plurality of gate signal lines 837 extending in a lateral direction of FIG. 1, and a plurality of drain signal lines 835 extending in a vertical direction of FIG. 1. The drive circuit 832 is connected to the plurality of gate signal lines 837, to thereby control each of the gate signal lines 837. Further, the drive circuit 833 is connected to the plurality of drain signal lines 835, to thereby control each of the drain signal lines 835. A region surrounded by the dashed-two dotted line of FIG. 1 corresponds to a display region 815. The gate signal lines 837 and the drain signal lines 835 divide the display region 815 in matrix, and each of the divided regions forms a pixel circuit 810. Each pixel circuit 810 includes a thin film transistor and a pixel electrode. Note that, FIG. 1 illustrates a simplified structure, and in particular, the number of the pixel circuits 810, the number of the gate signal lines 837, and the number of the drain signal lines 835 are illustrated smaller than in the actual case. Actually, the liquid crystal display device 900 includes the pixel circuits 810, the gate signal lines 837, and the drain signal lines 835 of the numbers corresponding to the resolution thereof.

The structure of the liquid crystal panel 800 may be any one of an in-plane switching (IPS) type, in which electrodes are provided only on the array substrate 830, and a twisted nematic (TN) type and a vertical alignment (VA) type, in which electrodes are provided on both of the array substrate 830 and the color filter substrate 820.

The backlight unit 950 includes a lightguide 100, a mold 920, LED light sources 60, and a flexible printed wiring board 845 onto which the LED light sources 60 are mounted. The lightguide 100 has a light exit region 140, which is a portion of the lightguide 100 which causes light to be used for display to exit correspondingly to the display region 815. The control circuit 842 is mounted on a flexible printed wiring board 840. The control circuit 842 controls the drive circuits 832 and 833 connected thereto via control lines 854, to thereby control the operation of the liquid crystal panel 800. Further, the control circuit 842 controls the LED light sources 60 via a control line 855. The LED light sources 60 are point light sources including light emitting diode modules. The display region 815 of the liquid crystal panel 800 and the light exit region 140 of the lightguide 100 both have a rectangular shape, and the liquid crystal panel 800 and the backlight unit 950 are overlapped with each other so that the display region 815 and the light exit region 140 are opposed to each other. Hereinafter, an extending direction of the long side of the rectangular shape of the display region 815 and the light exit region 140 is referred to as a long side direction, and an extending direction of the short side thereof is referred to as a short side direction.

Figure 2:
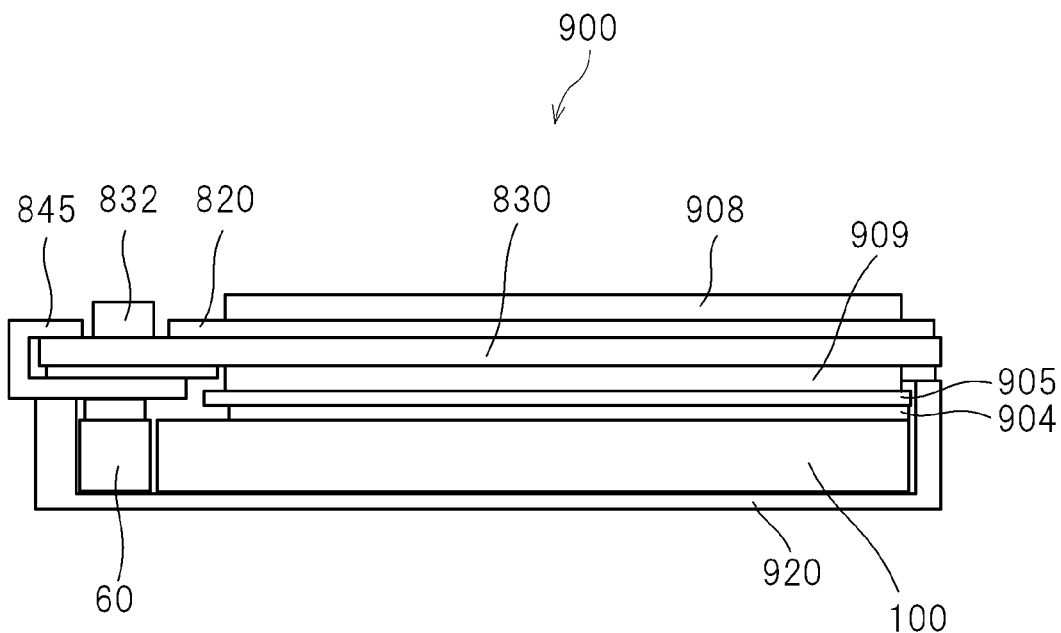
FIG. 2 is a sectional view illustrating the example of the liquid crystal display device according to the embodiment of the present invention.

FIG. 2 is a sectional view illustrating the example of the liquid crystal display device 900 according to the embodiment of the present invention. As illustrated in FIG. 2, the liquid crystal display device 900 includes, in addition to the structure illustrated in FIG. 1, a diffusion sheet 904 for uniformly diffusing the light exiting from the lightguide 100, a prism sheet 905 for aligning directions of the diffused light beams, and polarizing plates 908 and 909 for allowing light having only one direction component to pass therethrough. In the example of this embodiment, the prism sheet 905 is provided so as to suppress fluctuations of components of light exiting from the light exit region 140 in the long side direction. Note that, a prism sheet may be additionally provided between the prism sheet 905 and the polarizing plate 909 so as to suppress fluctuations of components of light in the short side direction.

Figure 3:
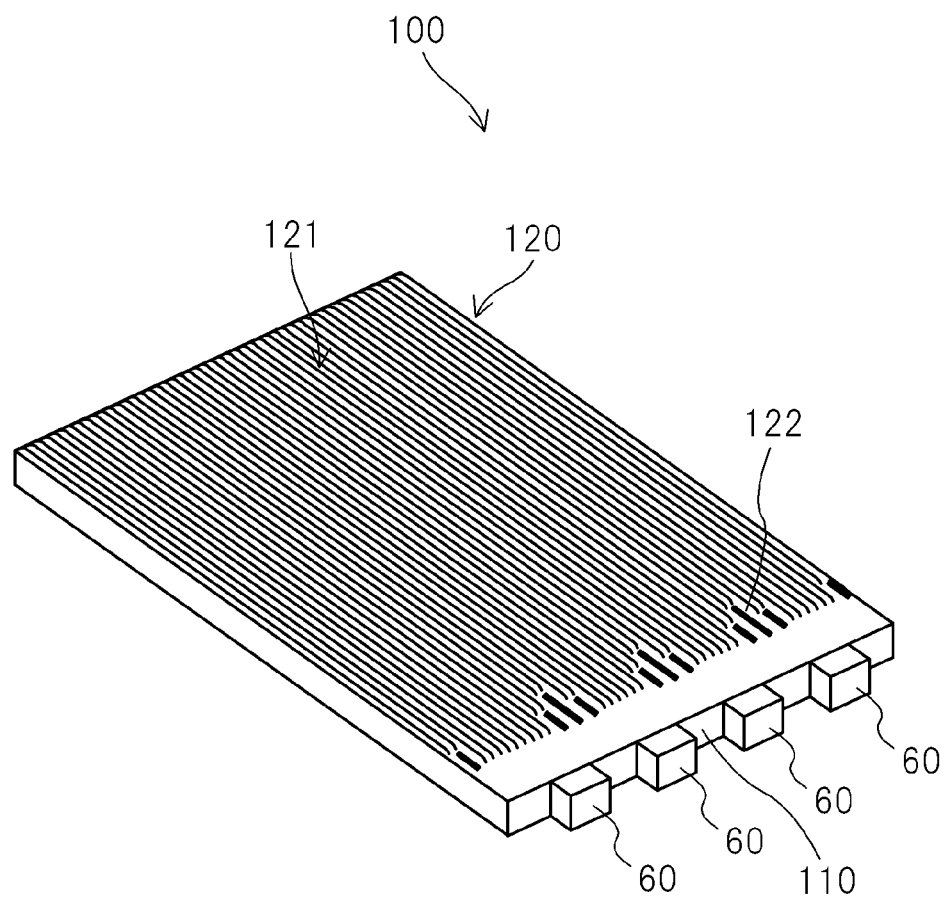
FIG. 3 is a view schematically illustrating an example of a lightguide according to the embodiment of the present invention.

FIG. 3 is a view schematically illustrating an example of the lightguide 100 according to the embodiment of the present invention. The lightguide 100 includes a light exit surface 120, which causes light to exit toward the liquid crystal panel 800, a reflection surface, which is opposed to the light exit surface 120, and a light entrance surface 110, which is one side surface with respect to the light exit surface 120. The lightguide 100 has a rectangular shape when viewed from the light exit surface 120 side, and the light entrance surface 110 corresponds to one side of the opposing short sides of the rectangular shape. The plurality of LED light sources 60 are provided on the outer side of the light entrance surface 110 and arranged in an extending direction of the short side. Each of the LED light sources 60 emits light toward the light entrance surface 110. At the reflection surface, a reflection pattern 131 is provided so as to suppress unevenness of light exiting from the light exit surface 120 in the long side direction.

Figure 4:
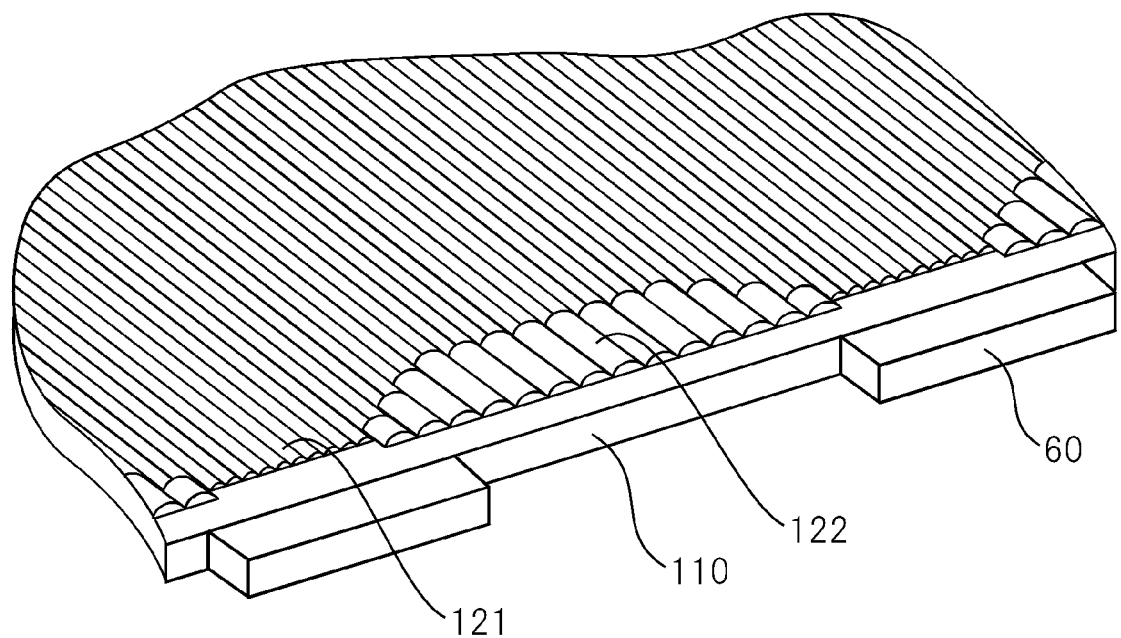
FIG. 4 is a partial enlarged view of the lightguide illustrated in FIG. 3.
Figure 5:
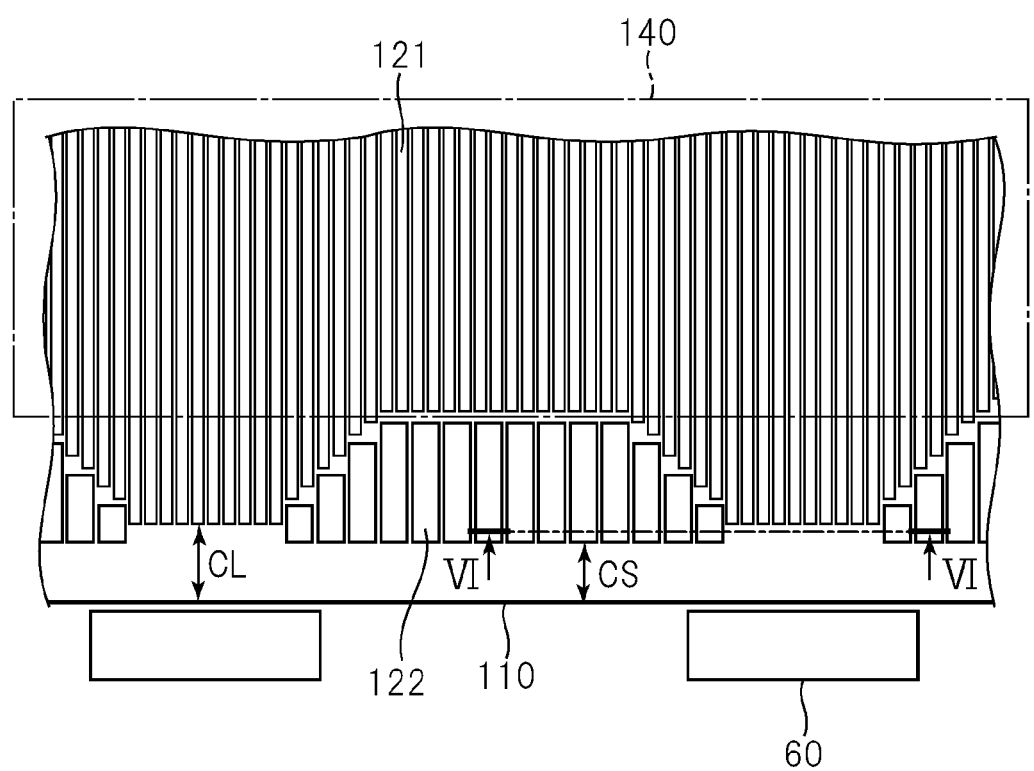
FIG. 5 is a partial plan view of the lightguide illustrated in FIG. 3.

On the light exit surface 120, there are provided a plurality of wide-area line-shaped protrusions 121 and a plurality of local-area line-shaped protrusions 122, which are each a line-shaped protrusion extending in a direction intersecting the light entrance surface 110, that is, the long side direction of the rectangular shape (first direction). Here, in the example of this embodiment, the first direction is a direction perpendicular to the light entrance surface 110. FIG. 4 is a partial enlarged view of the lightguide illustrated in FIG. 3, and FIG. 5 is a partial plan view of the lightguide illustrated in FIG. 3. The wide-area line-shaped protrusion 121 extends on the light exit surface 120 from the vicinity of a side surface opposed to the light entrance surface 110 toward a side corresponding to the light entrance surface 110 (hereinafter, referred to as "side on the light source side"). The side on the light source side has a first section in which a distance from a center of the LED light source 60, that is, a center of the point light source is shorter than a certain distance. The wide-area line-shaped protrusions 121 extending toward the first section extend up to a position which has a fixed clearance CL from the light entrance surface 110.

Meanwhile, the side on the light source side has a second section other than the above-mentioned section of the side on the light source side. The wide-area line-shaped protrusions 121 extending toward the second section each have an end on the light entrance surface 110 side at a position farther than the clearance CL from the light entrance surface 110. In a region on the light exit surface 120 closer to the light entrance surface 110 than those wide-area line-shaped protrusions 121, the local-area line-shaped protrusions 122 are formed. Further, a clearance CS between the light entrance surface 110 and an end of the local-area line-shaped protrusion 122 on the light entrance surface 110 side is smaller than the clearance CL. When viewed from the light entrance surface 110, the local-area line-shaped protrusions 122 are arranged on a region of the light exit surface 120 on the front side of an intermediate portion between the adjacent point light sources, and the wide-area line-shaped protrusions 121 are arranged further on the front side of the local-area line-shaped protrusions 122 and on the front side of a region other than the intermediate portion between the point light sources.

Further, in the example of FIGS. 4 and 5, the end of the wide-area line-shaped protrusion 121 on the light entrance surface 110 side and the end of the local-area line-shaped protrusion 122 on a side opposite to the light entrance surface 110 are adjacent to each other. In different viewpoint, into the region on the light exit surface 120 in which the wide-area line-shaped protrusions 121 are formed, the region on the light exit surface 120 in which the local-area line-shaped protrusions 122 are formed is intruded. In different viewpoint, it can be said that, in a region on the light exit surface 120, which is separated from the light entrance surface 110 by a fixed clearance or larger and in which the local-area line-shaped protrusion 122 is absent, the plurality of wide-area line-shaped protrusions 121 are arranged, which are each a line-shaped protrusion extending in the first direction. Further, the local-area line-shaped protrusions 122 are provided on the light entrance surface 110 side relative to one side of the light exit region 140 on a side opposite to the light entrance surface 110. In particular, in the example of this embodiment, the local-area line-shaped protrusions 122 are provided between the light exit region 140 and the light entrance surface 110.

A distance between the light entrance surface 110 and the end of the local-area line-shaped protrusion 122 on the side opposite to the light entrance surface 110 (referred to as upper end) is determined depending on the positional relationship between the local-area line-shaped protrusion 122 and the point light source. The distance between the upper end of the local-area line-shaped protrusion 122 and the light entrance surface 110 tends to increase as a portion within the display region 815, which is at a destination of the extension of the local-area line-shaped protrusion 122, is at a position liable to be dark. Accordingly, local-area line-shaped protrusions of the plurality of local-area line-shaped protrusions 122, which are formed farthest from the two adjacent LED light sources 60, have the above-mentioned distance larger than that of local-area line-shaped protrusions formed closest to any one of those LED light sources 60. Here, in the example of FIGS. 4 and 5, the distance between the light entrance surface 110 and the end of the local-area line-shaped protrusion 122 on the light entrance surface 110 side is constant (Cs), and hence the local-area line-shaped protrusions of the plurality of local-area line-shaped protrusions 122, which are formed farthest from the two adjacent LED light sources 60, have a length larger than that of the local-area line-shaped protrusions formed closest to any one of those LED light sources 60. Note that, specifically, the local-area line-shaped protrusions 122 are arranged as illustrated in FIG. 5. The optimum arrangement may be determined by way of experiment.

Figure 6:
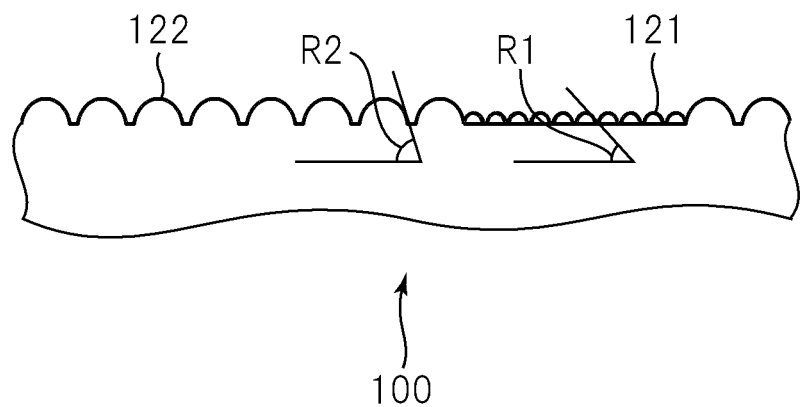
FIG. 6 is a sectional view cut along the line IV-IV of FIG. 5.

Here, the wide-area line-shaped protrusion 121 and the local-area line-shaped protrusion 122 have characteristics of reflecting light traveling inside the lightguide through total reflection so that a component of the light which is orthogonal to the first direction is weakened. As a member having such characteristics, there is, for example, an arc-like cylindrical lens. FIG. 6 is a sectional view cut along the line IV-IV of FIG. 5. This cross section is perpendicular to the first direction. As illustrated in FIG. 6, a contact angle R2 of the cylindrical lens forming the local-area line-shaped protrusion 122 is larger than a contact angle R1 of the cylindrical lens forming the wide-area line-shaped protrusion 121. Here, the contact angle refers to an angle between the light exit surface and the tangent to the cylindrical lens at a position at which the cylindrical lens is held in contact with the light exit surface. This means that the central angle of the cylindrical lens forming the local-area line-shaped protrusion 122 is larger than the central angle of the cylindrical lens forming the wide-area line-shaped protrusion 121. In the line-shaped protrusion using the cylindrical lens, as the contact angle is larger, a force of weakening the component of the reflected light, which is orthogonal to the direction in which the line-shaped protrusion extends, becomes larger. That is, the local-area line-shaped protrusion 122 reflects the light inside the lightguide so that the component of the light which is orthogonal to the first direction is more weakened compared to a case where the light is reflected by the wide-area line-shaped protrusion 121.

Figure 7:
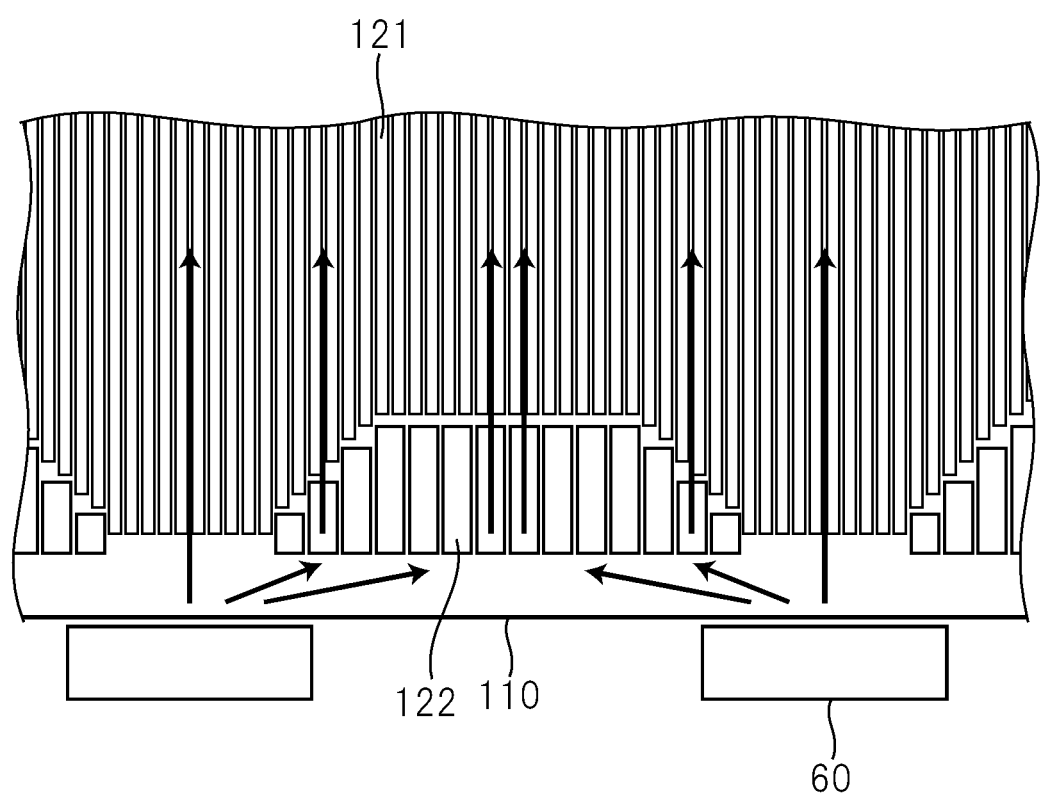
FIG. 7 is a view schematically illustrating a traveling direction of light inside the lightguide.

With those structures, luminance unevenness appearing in the display region due to the light exiting from the lightguide 100 is reduced. This reduction is related to the fact that the component of light traveling inside the lightguide 100, which is orthogonal to the first direction, is suppressed. Originally, a region within the light exit region 140, which corresponds to a position at which luminance is liable to reduce in the display region 815, is the front side of the intermediate portion between the point light sources and the vicinity of the light entrance surface 110. In those regions, the component of the light emitted from the LED light source 60, which is orthogonal to the first direction, tends to be large. The lightguide 100 according to the embodiment of the present invention has an effect of allowing the traveling direction of light reaching those regions to come closer to the first direction. FIG. 7 is a view schematically illustrating the direction of the light traveling inside the lightguide 100. The light directed to the local-area line-shaped protrusion 122 close to the center between the two adjacent LED light sources 60 is directed to come closer to the first direction owing to the local-area line-shaped protrusions 122.

Figure 8:
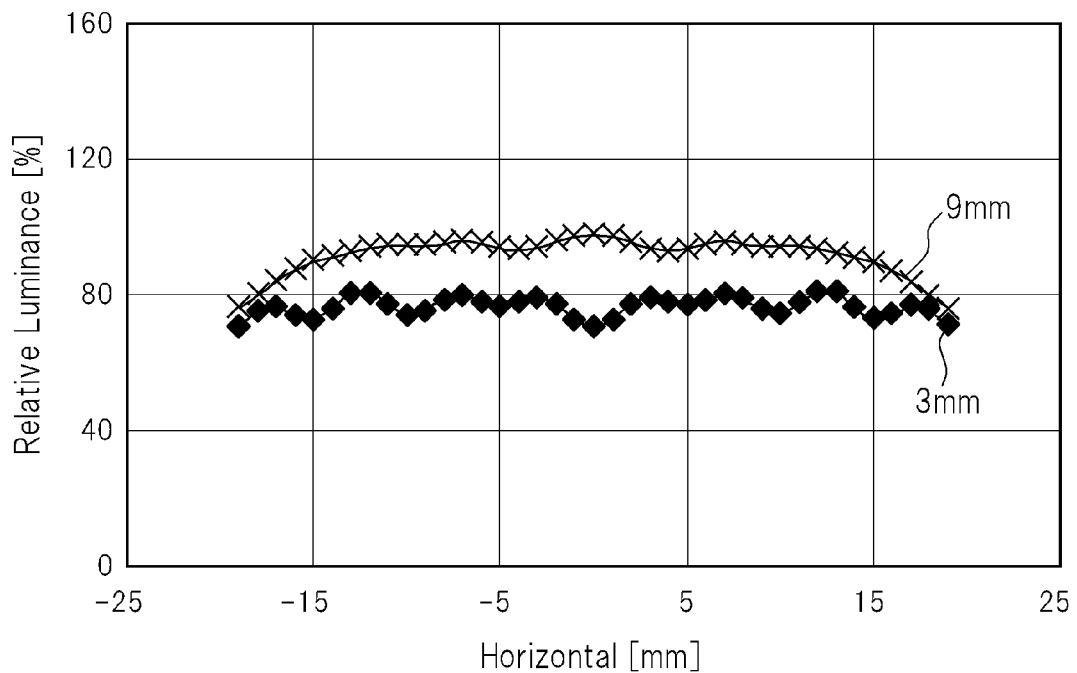
FIG. 8 is a graph illustrating variations within a display region of intensity of light exiting from the liquid crystal display device according to the embodiment.
Figure 9:
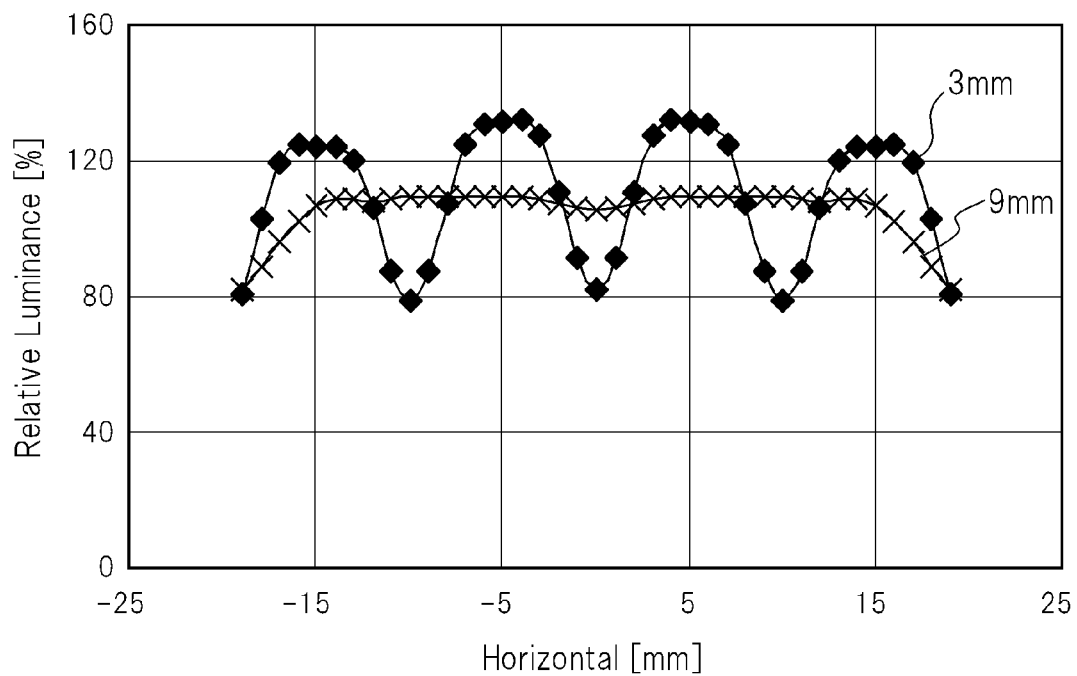
FIG. 9 is a graph illustrating variations within a display region of intensity of light exiting from the display region of a conventional liquid crystal display device.

FIG. 8 is a graph illustrating variations within the display region 815 of intensity of light exiting from the liquid crystal display device 900 according to this embodiment. FIG. 8 illustrates the variations of the relative luminance in a direction orthogonal to the first direction of the display region 815 (horizontal direction) in cases where a clearance from the end of the display region 815 closer to the light entrance surface 110 is 3 mm and 9 mm. The relative luminance refers to a numerical value in a case where the average luminance of the entire screen is set as 100. The effect of the present invention is quite obvious when compared to results in a case where the present invention is not applied. FIG. 9 is a graph illustrating variations within the display region 815 of intensity of light exiting from the display region 815 of a conventional liquid crystal display device. It is found that the luminance unevenness in the horizontal direction at a portion of the display region 815 closer to the light entrance surface is drastically suppressed.

The reason why the luminance unevenness reduces by weakening the component of light which is orthogonal to the first direction may be because, for example, by aligning the directions of light beams exiting from the light exit surface 120, the directions of the light beams entering the prism sheet 905 become the same, and a difference of the amount of light directed toward the normal of the display panel is reduced. Another reason may be because, for example, the amount of light which is totally reflected at the region at which the display is liable to be dark is suppressed to allow larger amount of light to exit.

Figure 10:
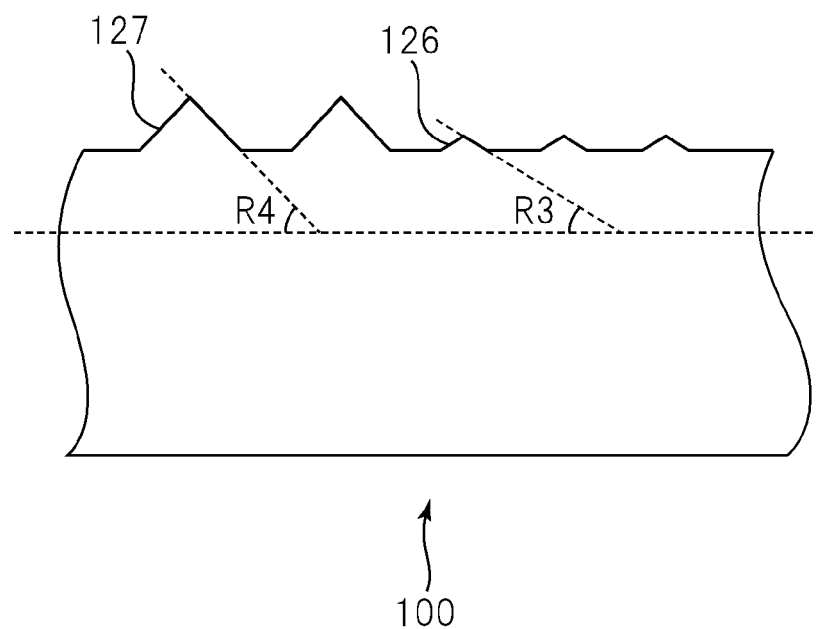
FIG. 10 is a sectional view illustrating another example of line-shaped protrusions provided in a light exit surface.

Here, as a wide-area line-shaped protrusion 126 and a local-area line-shaped protrusion 127, a line-shaped protrusion having a V-shaped cross section may be used. FIG. 10 is a sectional view illustrating another example of the line-shaped protrusions provided in the light exit surface 120. An angle R4 between the light exit surface 120 and any one of the surfaces of the V-shape forming the local-area line-shaped protrusion 127 is larger than an angle R3 between the light exit surface 120 and any one of the surfaces of the V-shape forming the wide-area line-shaped protrusion 126. With this structure, the local-area line-shaped protrusion 127 reflects the light inside the lightguide so that the component of the light which is orthogonal to the first direction is weakened compared to a case where the light is reflected by the wide-area line-shaped protrusion 126.

Figure 11:
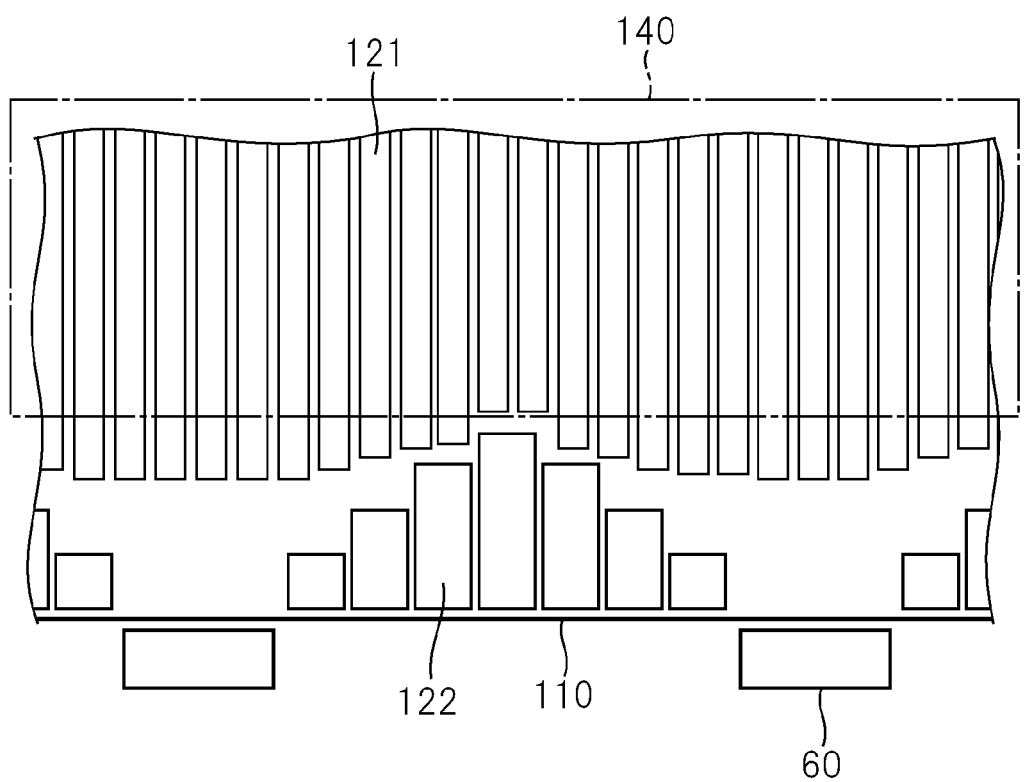
FIG. 11 is a view schematically illustrating another example of the lightguide according to the embodiment of the present invention.

Further, the local-area line-shaped protrusion 122 may be spaced apart from the wide-area line-shaped protrusion 121. FIG. 11 is a view schematically illustrating another example of the lightguide 100 according to the embodiment of the present invention. In the example of FIG. 11, the clearance between the light entrance surface 110 and the end of the local-area line-shaped protrusion 122 on the light entrance surface 110 side is narrower than that in the example of FIG. 4, and accordingly, a gap between the end of the wide-area line-shaped protrusion 121 on the light entrance surface 110 side and the end of the local-area line-shaped protrusion 122 on the side opposite to the light entrance surface is increased.

Also in the example of FIG. 11, the directions of light beams to be caused to pass through the local-area line-shaped protrusion 122 are aligned to the first direction, and the directions of the light beams to reach the position at which the luminance is liable to reduce come closer to the first direction.

Figure 12:
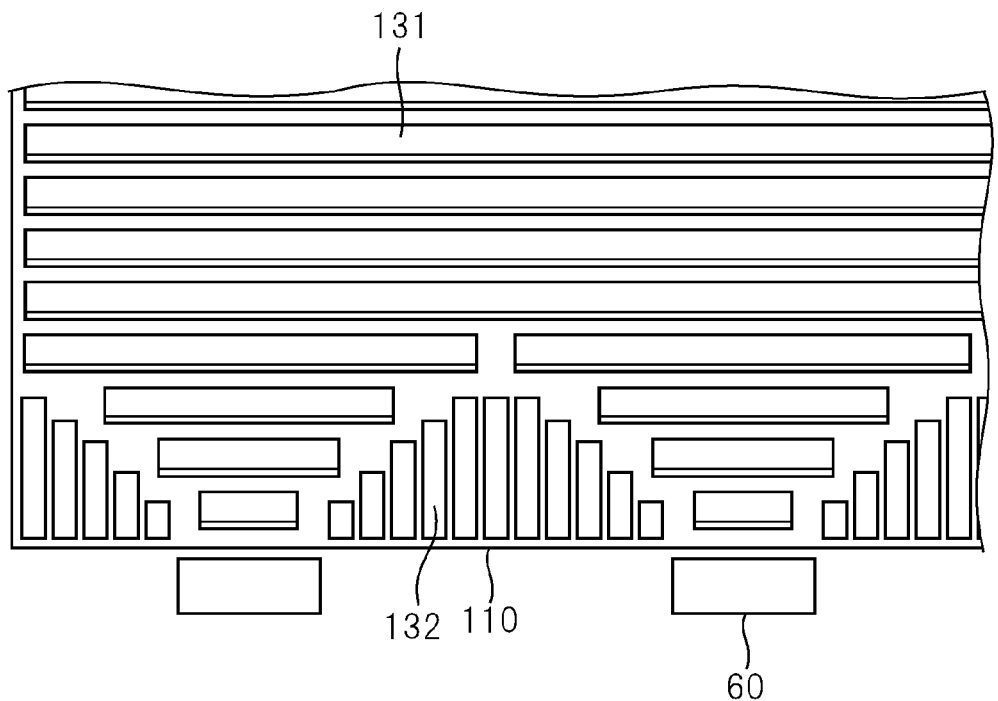
FIG. 12 is a view schematically illustrating still another example of the lightguide according to the embodiment of the present invention.
Figure 13:
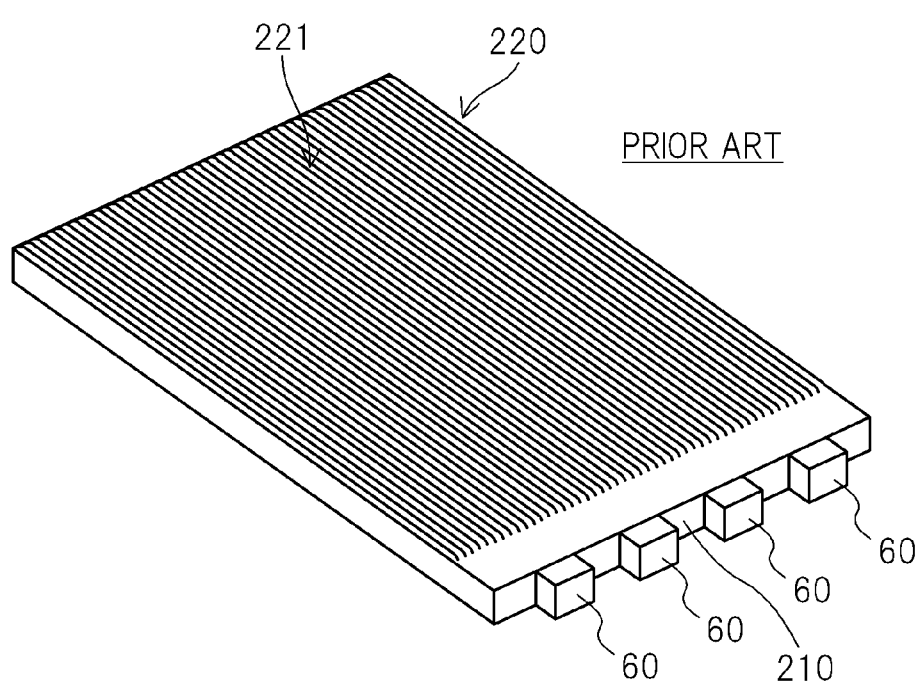
FIG. 13 is a view illustrating an example of a conventional lightguide.

Further, local-area line-shaped protrusions 132 may be provided to the reflection surface of the lightguide 100. FIG. 12 is a view schematically illustrating still another example of the lightguide according to the embodiment of the present invention. In the reflection surface of the lightguide 100, the reflection pattern 131 and the local-area line-shaped protrusions 132 are formed. The reflection pattern 131 is specifically grooves or protrusions extending in the direction orthogonal to the first direction. The wide-area line-shaped protrusions 121 are provided on a region of the reflection surface on the front side of the intermediate portion between the two adjacent LED light sources 60 when viewed from the light entrance surface 110. When the local-area line-shaped protrusions 132 are provided on the light entrance surface 110 side relative to the position corresponding to the light exit region 140, even such a structure can provide the above-mentioned effects.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
   a lightguide comprising:
      a light exit surface from which light exits;
      a reflection surface opposed to the light exit surface; and
      a light entrance surface, which is one side surface with respect to the light exit surface and through which the light enters;
   a liquid crystal panel arranged opposed to the light exit surface of the lightguide; and
   a plurality of light sources for causing the light to enter through the light entrance surface, wherein:
   the lightguide further comprises a plurality of local-area line-shaped protrusions, which are each a line-shaped protrusion extending in a first direction intersecting the light entrance surface, the plurality of local-area line-shaped protrusions being arranged on a region of the light exit surface in an intermediate portion of the light exit surface between two adjacent light sources of the plurality of light sources adjacent the light entrance surface; and
   a plurality of wide-area line-shaped protrusions, which are each a line-shaped protrusion extending in the first direction, the plurality of wide-area line-shaped protrusions being arranged in a region on the light exit surface and some of the plurality of wide-area line-shaped protrusion not being arranged in the intermediate portion of the light exit surface between the two adjacent light sources;
   each of the plurality of local-area line-shaped protrusions reflects light inside the lightguide so that a component of the light which is orthogonal to the first direction is weakened;
   each of the plurality of local-area line-shaped protrusions having a first end spaced from the light entrance surface and provided at a position closer to the light entrance surface than a second end which is provided at a position farther from the light entrance surface, of a light exit region on the light exit surface, the light exit region corresponding to a display region;
   a distance between the light entrance surface and one of the second ends of the plurality of local-area line-shaped protrusions, which is farthest from the two adjacent light sources, is larger than a distance between the light entrance surface and one of the second ends of the plurality of local-area line-shaped protrusions, which is closest to any one of the two adjacent light sources; and
   each of the plurality of wide-area line-shaped protrusions having a first end spaced at least a predetermined distance from the light entrance surface, the first end of one of the plurality of wide-area line shaped protrusions disposed at a position within the intermediate portion of the light exit surface farthest from the two adjacent light sources having a distance from the light entrance surface which is larger than a distance of the first end of the some of the plurality of wide-area line shaped protrusions not arranged in the intermediate portions of the light exit surface.

2. The liquid crystal display device according to claim 1, wherein:
   the first ends of the plurality of wide-area line-shaped protrusions in which in the intermediate portion of the light exit surface are arranged adjacent to the second ends of the plurality of local-area line-shaped protrusions in the first direction; and
   each of the plurality of wide-area line-shaped protrusions reflects the light inside the lightguide so that the component of the light which is orthogonal to the first direction is less weakened compared to the each of the plurality of local-area line-shaped protrusions.

3. The liquid crystal display device according to claim 1, wherein:
   each of the plurality of wide-area line-shaped protrusions and each of the plurality of local-area line-shaped protrusions have an arc-like cross section; and
   a central angle of each of the plurality of local-area line-shaped protrusions is larger than a central angle of each of the plurality of wide-area line-shaped protrusions.

4. The liquid crystal display device according to claim 1, wherein:
   each of the plurality of wide-area line-shaped protrusions and each of the plurality of local-area line-shaped protrusions have a V-shaped cross section; and
   an angle between the light exit surface and each of the plurality of local-area line-shaped protrusions is larger than an angle between the light exit surface and each of the plurality of wide-area line-shaped protrusions.

5. The liquid crystal display device according to claim 1, wherein a length of the local-area line-shaped protrusion of the plurality of local-area line-shaped protrusions, which is farthest from the two adjacent light sources, is larger than a length of the local-area line-shaped protrusion of the plurality of local-area line-shaped protrusions, which is closest to any one of the two adjacent light sources.

6. The liquid crystal display device according to claim 1, wherein the plurality of local-area line-shaped protrusions are arranged between the light exit region on the light exit surface and the light entrance surface.

7. The liquid crystal display device according to claim 1, wherein each of the plurality of local-area line-shaped protrusions have the first end spaced from the light entrance surface a distance which is shorter than a distance of the first end of each of the plurality of wide-area line-shaped protrusions from the light entrance surface.

8. A lightguide, which is to be used in a liquid crystal display device, comprising:
- a light exit surface including a light exit region, which causes light to be used for display to exit;
- a reflection surface opposed to the light exit surface;
- a light entrance surface, which is one side surface with respect to the light exit surface and through which the light from a plurality of light sources enters;
- a plurality of local-area line-shaped protrusions, which are each a line-shaped protrusion extending in a first direction intersecting the light entrance surface, the plurality of local-area line-shaped protrusions being arranged on a region of the light exit surface on a front side of an intermediate portion between two adjacent light sources of the plurality of light sources when viewed from the light entrance surface; and
- a plurality of wide-area line-shaped protrusions, which are each a line-shaped protrusion extending in the first direction, the plurality of wide-area line-shaped protrusions being arranged in a region on the light exit surface, which is spaced from the light entrance surface and some of the plurality of wide-area line shaped protrusions not arranged in the intermediate portion where plurality of local-area line-shaped protrusions are arranged; wherein:
- each of the plurality of local-area line-shaped protrusions reflects the entered light so that a component of the entered light which is orthogonal to the first direction is weakened;
- each of the plurality of local-area line-shaped protrusions having a first end spaced from the light entrance surface and provided at a position closer to the light entrance surface than a second end which is provided at a position farther from the light entrance surface, of the light exit region;
- a distance between the light entrance surface and one of the second ends of the plurality of local-area line-shaped protrusions, which is farthest from the two adjacent light sources, is larger than a distance between the light entrance surface and one of the second ends of the plurality of local-area line-shaped protrusions, which is closest to any one of the two adjacent light sources.

9. The lightguide according to claim 8, wherein each of the plurality of local-area line-shaped protrusions have the first end spaced from the light entrance surface a distance which is shorter than a distance of the first end of each of the plurality of wide-area line-shaped protrusions from the light entrance surface.

* * * * *